Aug. 27, 1963

S. H. RASKIN 3,101,800

WEIGHING OF MOVING OBJECTS

Filed Aug. 4, 1958

INVENTOR.
SEYMOUR H. RASKIN
BY [signatures]
ATTORNEYS

INVENTOR.
SEYMOUR H. RASKIN

Aug. 27, 1963  S. H. RASKIN  3,101,800
WEIGHING OF MOVING OBJECTS
Filed Aug. 4, 1958  6 Sheets-Sheet 4

INVENTOR.
SEYMOUR H. RASKIN
BY
ATTORNEYS

Aug. 27, 1963  S. H. RASKIN  3,101,800
WEIGHING OF MOVING OBJECTS
Filed Aug. 4, 1958  6 Sheets-Sheet 5

INVENTOR.
SEYMOUR H. RASKIN
BY Pennie Edmunds
Morton Barrows & Taylor
ATTORNEYS Aug. 27, 1963    S. H. RASKIN    3,101,800
WEIGHING OF MOVING OBJECTS
Filed Aug. 4, 1958    6 Sheets-Sheet 6

INVENTOR.
SEYMOUR H. RASKIN

BY *Pennie, Edmonds, Morton,
Burrows and Taylor*

ATTORNEYS

United States Patent Office 3,101,800
Patented Aug. 27, 1963

3,101,800
WEIGHING OF MOVING OBJECTS
Seymour H. Raskin, Cincinnati, Ohio, assignor, by mesne assignments, to Railroad Machinery Development Corporation, Cincinnati, Ohio, a corporation of Ohio
Filed Aug. 4, 1958, Ser. No. 752,731
23 Claims. (Cl. 177—1)

This invention relates to the weighing of moving objects, and more particularly to a method and apparatus for actuating a scale and for weighing objects which slide or roll across a weight-sensitive platform, of which the weighing of railway cars and trucks while in motion are examples.

The methods and apparatus heretofore proposed for the weighing of objects while in motion have not been entirely satisfactory in that the static weighing errors and the dynamic weighing errors caused by vibration in the object to be weighed or in the weighing mechanism itself have introduced errors which, in some instances, are of such magnitude that the weight indicated by the particular weighing mechanism does not come within the maximum allowable tolerance.

In accordance with the present method and apparatus a more accurate weighing of moving objects is obtained in that the weighing errors in the weighing cycle caused by vibration in the object or in the weighing mechanism are sensed, measured, and, if significant, prevent the recording of the erroneous weights. Also, the static weighing errors in any weighing cycle are sensed, measured, fed back and compensated for before the next weighing cycle.

The present invention further provides for the accurate measurement of static forces having dynamic forces super-imposed thereon, regardless of the source of said forces.

It is an important feature of the present invention that the recording of the true weights of the moving objects is initiated, not by arbitrary conditions of time or of position of the weight upon the scale, but more desirably, by the stability and equilibrium of the object and scale mechanism.

The invention will be described in detail in connection with the accompanying drawings in which.

In the following detailed descriptions, like reference characters indicate like parts.

Figure 1:
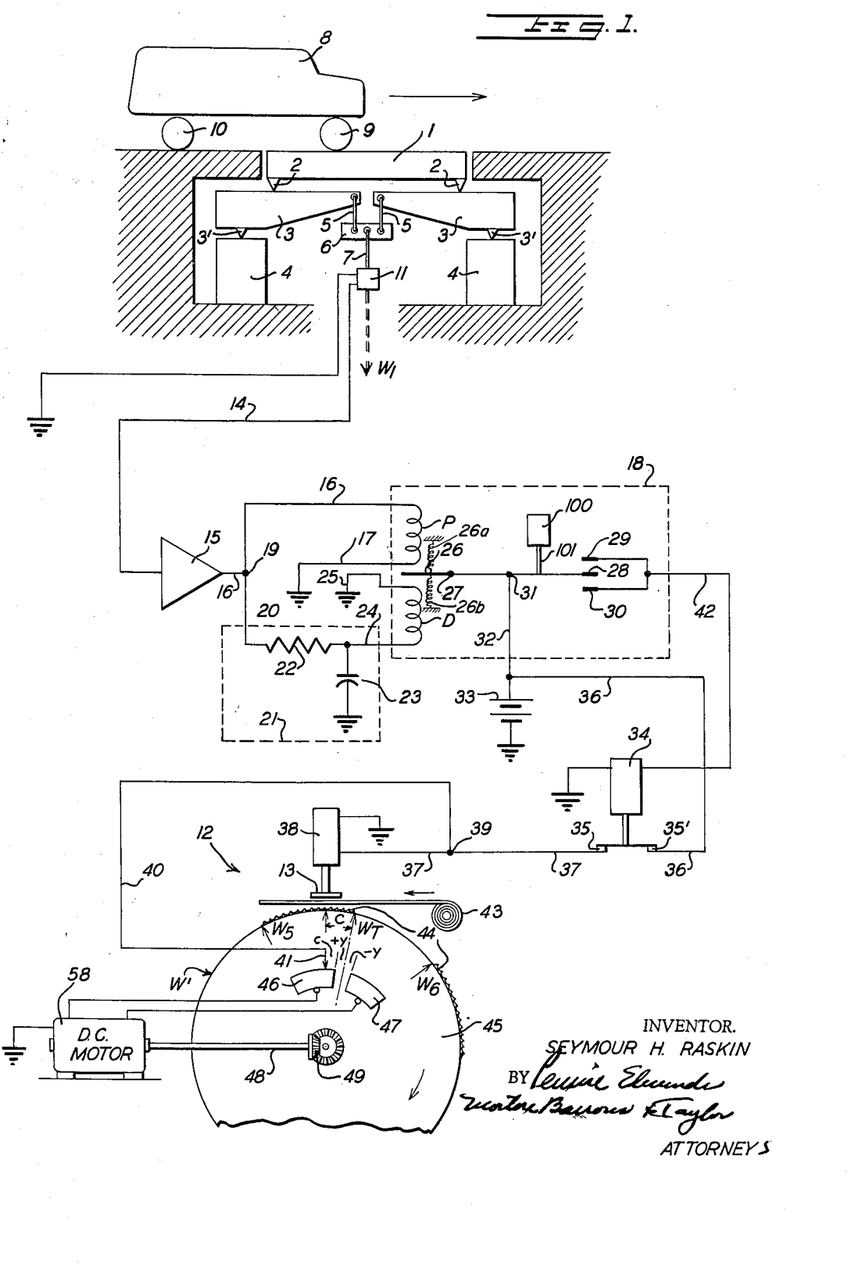
FIG. 1 is a diagrammatic view of a scale weighing and recording mechanism embodying the present invention, with the front wheels of a truck shown on the scale platform.

The scale mechanism shown in FIG. 1 is located in an excavated pit in the ground and comprises a platform 1 over which a vehicle to be weighed is adapted to pass. The platform has knife edges 2 supported on oscillatable levers 3. Levers 3 have knife edges 3' adjacent their outer ends about which the levers 3 oscillate and which in turn are supported by pedestals 4. Pedestals 4 are mounted on the groundd forming the floor of the pit. The inner ends of the levers 3 are connected through linkages 5 to the opposite end portions of a movable block 6, the linkages 5 having a pivotal connection with block 6.

An application of a weight or load to platform 1 will cause the inner ends of levers 3 to move downwardly toward the center of the pit floor, thereby exerting a downward force on linkages 5, and through them will impart a downward motion to block 6. Block 6 also has pivotally connected to it a rod 7. Any motion of block 6 is thereby imparted to rod 7. Hence, the total motion created in platform 1 is transmitted through rod 7, after being amplified by the mechanical advantage of the levers. Therefore, it follows that any weight or vertical force applied to platform 1 is similarly transmitted through rod 7, with the forces in rod 7 being reduced due to the mechanical advantages in the scale system.

The above type of scale mechanism is old and common in the art and is known as a lever-type mechanical scale.

In FIG. 1, a truck 8 moving in the direction indicated by the arrow, is shown in the process of being weighed. It has its front wheels on the platform or force-receiving member 1 and exerting a downward force thereon, as well as on the levers 3 and their associated mechanism. The rear wheels of the truck are still being supported on the roadbed in advance of the platform and, therefore, are not exerting any downward force on the platform or on its associated lever system. With the truck in this position, only the weight on the front wheels of the truck is being weighed. This type of weighing is known as "two-draft" weighing, in that the weight on the front wheels or truck of the vehicle is weighed separately from the weight on the rear wheels or truck and the two weights are added together to obtain the total weight of the vehicle. In this type of weighing, the weighing platform will have a length less than the wheel base of the vehicle, so it will be impossible to have the rear wheels of the vehicle on the scale platform at the same time the front wheels are on it, and vice versa.

The weight of the front end of the vehicle 8 transmitted to the scale through the wheels 9 is being sensed by the scale mechanism and the proportionate force transmitted to the rod 7 can, therefore, be measured as $W_1$. The weight or vertical force exerted by the scale mechanism itself is the tare weight of the scale and the proportionate force exerted on the rod 7 can be measured as WT.

For the purpose of converting the proportionate mechanical forces exerted on rod 7, a transducer 11 is built into the rod. Such transducers are old and common in the art and are commonly referred to as strain gages or load cells. Any type of transducer may be used for converting the form of the proportionate mechanical force in rod 7 by transmitting hydraulic pressure, electric or other signals. It will be described herein for the transmission of electrical signals. These signals will be a voltage which will vary in direct proportion to the mechanical force transmitted to rod 7.

The proportionate weight force $W_1$ transmitted to rod 7 is transmitted by it through linkages (not shown) to a mechanical recorder 12. The recorder 12 is constantly measuring the weight transmitted to it and indicating the displacement of the platform 1 on a displacement indicator which includes a displaceable indicating element or wheel 45. It is prepared to make a printed record of such transmitted weight at any time a printing plunger 13 is actuated to stamp the measured weight. The primary objective of this invention is to assure that the printing plunger 13 will be actuated only when the weight being measured by the recorder is equal to the true weight $W_1$ plus or minus not more than an allowable tolerance X. This is accomplished as follows.

As the wheels 9 come onto the scale platform 1, the forces being transmitted to the recorder by rod 7 are proportionally increased and the voltage signal being transmitted by transducer 11 is correspondingly increased. The voltage signal from transducer 11 is transmitted through line 14 to an electronic amplifier 15 of conventional form. The output of amplifier 15 is a voltage signal which is greater than, but directly proportional to, its input signal being received through line 14. The output of the amplifier controls the operation of the printing plunger 13 by means of a relay which will now be described. The amplified signal passes through a first circuit which includes line 16 and coil P. Said signal may be referred to as a "pure" signal in that it does not have a time delay, but conversely, instantaneously changes with the original signal being generated by the transducer 11 through line 14. Line 16 is connected to electromagnetic coil P which is part of differential relay 18, and the pure signal is at all times being instantaneously transmitted through coil P which is connected to ground at 17.

At terminal 19 an additional line 20 transmits the pure signal to a second circuit including a filter 21 and coil D. The filter is a known type of resistance-capacitance network including a resistor 22 in series in line 20 and a capacitor 23 in parallel with line 20. The filter 21 acts to damp out the high frequency oscillating signals of the pure signal in lines 16 and 20 and also acts to delay remaining low frequency changes in pure signal in relation to time, thereby generating a delayed signal. The delayed signal is transmitted from filter 21 through line 24 to a second electro-magnetic coil D of differential relay 18. Coil D is connected to ground at 25. If the voltage drop through the filter 21 is too great, a second amplifier, similar to amplifier 15, may be placed in line 24 to compensate for it.

The electro-magnetic coils P and D are part of differential relay 18, which can best be described as a differential relay having a time delay. There are many relays of this type commonly available and the operation of the relay 18 shown in the drawing has been simplified for purposes of clarity.

The passage of a pure signal through coil P will exert a magnetic force upon arm or magnetic body 26 of relay 18, and since the arm 26 is pivoted at 27, it will tend to move toward coil P. Similarly, the passage of a delayed signal through coil D will exert a magnetic force on arm 26 and tend to move it toward coil D. Therefore, it can be seen that arm 26 indicates the difference between the pure signal passing through coil P and the delayed signal passing through coil D and will remain in the center position, as shown in the drawing, only when the pure signal is equal to the delayed signal.

In order to prevent arm 26 from chattering back and forth between coils P and D when the pure and delayed voltages are out of balance by a negligible value, it is spring loaded by springs 26a and 26b to the center position so that a plus or minus voltage unbalance between coils P and D of less than tolerance X will not move arm 26. However, if the voltage unbalance between coils P and D is greater than tolerance X, the arm 26 will move toward the coil having the higher voltage, thereby bringing contact 28 at the opposite end of arm 26 into electrical contact with either contact 29 or 30.

During high frequency oscillations of the pure signal passing through coil P, the voltage unbalance between coils P and D could be less than tolerance X for such a relatively short period of time that, if the recorder were to be actuated from such a brief condition, the forces being transmitted could again come out of tolerance before the recorder had time to physically operate. In other words, care is taken to make sure that the forces being transmitted by the scale are stable for a significant length of time to insure a true stability or equilibrium within tolerance, rather than momentary passing through the potential equilibrium value. This time interval will be referred to as having a value TD.

In order to effect such a time delay in the operation of relay 18 and eliminate chattering of arm 26, the movement of arm 26 is delayed so that the voltage unbalance between coils P and D must be less than tolerance X for a time interval TD in order for arm 26 to return to center after once having been magnetically away from the center position. This time delay mechanism 100 which may be either a hydraulic piston timing mechanism or a pneumatic timing mechanism is connected to arm 26 through suitable linkage 101.

At any time the voltage signals in coils P and D are unbalanced by a value greater than tolerance X, arm 26 will be moved toward either coil P or D so that electrical contact is made with contact 29 or 30.

Connected to arm 26 at terminal 31 is a control circuit which includes line 32 which carries an actuating voltage from battery 33, said actuating voltage being independent of all other previously mentioned voltages. This actuating voltage passes through arm 26 and energizes contact 28. When arm 26 is in the center position, as shown, the actuating voltage through contact 28 is not connected to either contact 29 or 30, and, therefore, there is no voltage across solenoid 34 which is connected to said contacts through line 42. Solenoid 34, which actuates a controlled circuit, is spring loaded to be normally closed in the position shown when there is no voltage across its coil. Therefore, its contacts 35 and 35' will connect line 36 to line 37 of the controlled circuit to transmit an actuating voltage from battery 33 to coil 204 of solenoid 38, the core of which carries the printing plunger 13. Solenoid 38 is spring loaded by spring 203 to hold printing plunger 13 in its up position, so that the transmission of the actuating voltage through line 37 to solenoid 38 will electro-magnetically move the printing plunger 13 downwardly to print the weight being presented at that time by recorder 12, as hereinafter described. The operation of the device will cause the recorder 12 to print the accurate weight of wheels 9 only when the vehicle and the scale mechanism are in vertical equilibrium within the tolerance of plus or minus X, inasmuch as a substantial unbalance between pure and delayed signals will cause arm 26 to move sufficiently to bring contacts 28 into electrical contact with either of contacts 29 or 30, thereby transmitting an actuating voltage to solenoid 34, which breaks the electrical continuity between line 36 and line 37, resulting in loss of voltage across solenoid 38 and further resulting in the raising of printing plunger 13.

An electrical line 40 is connected to line 37 at terminal 39 so that an electrical wiper contact 41 will be energized simultaneously with solenoid 38.

Equilibrium in the entire system results in the de-energizing of solenoid 34, and causes contacts 35 and 35' to connect lines 36 and 37 so that the actuating voltage also energizes line 40 and electrical wiper contact 41. This condition also causes solenoid 38 to drive the printing plunger 13 downwardly and thereby forces the paper tape 43 against raised type faces 44 of a type wheel 45, and the type face engaging the tape indicates a digitized value of the displacement of the platform 1. Since the raised type faces 44 are arranged proportionally around wheel 45 the actuation of printing plunger 13 will cause a permanent record to be made on paper 43 and this printed record will correspond to the particular value of the raised type which is directly beneath the center line of the printing plunger at the time of printing.

Figure 10:
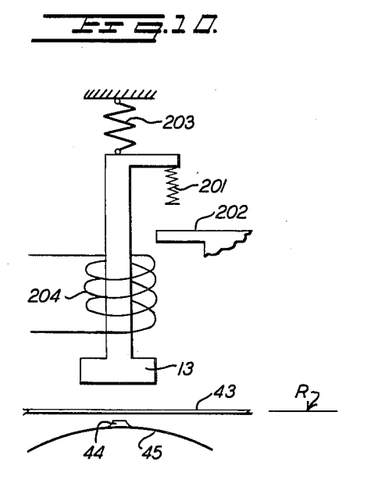
FIGS. 10 to 12 are diagrammatic views of the recoil mechanism for the solenoid-actuated printing plunger.
Figure 11:
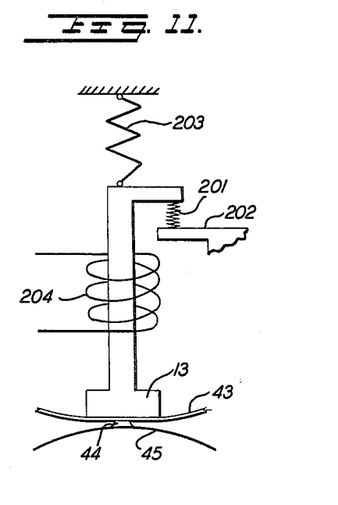
Figure 12:
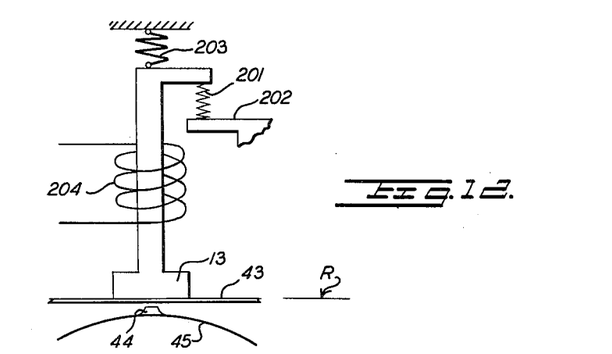

A recoil mechanism is provided which withdraws the plunger 13 from its lowest position after a weight has been printed. Thus, the printing tape 43 is pressed against the raised type face 44 only once each time the scale reaches equilibrium. The recoil mechanism, shown in FIGS. 10–12 includes a spring 201, rigidly fastened to the plunger 13 and a shelf 202 which lies in the path of spring 201 when the plunger moves down.

Plunger 13 is drawn down by the flow of current through coil 204 of solenoid 34 which overcomes spring 203. As the plunger presses tape 43 against type face 44, spring 201 engages shelf 202 and is compressed. See FIG. 11. Spring 201 and spring 203 are sufficiently strong to partially overcome the force exerted by the flow of current in coil 204, and force the plunger 13 upwardly a sufficient distance to release the tape 43 from compression against type face 44. See FIG. 12. When the scale is again disturbed from its equilibrium position, the flow of current in coil 204 is interrupted and plunger 43 is raised by spring 203 to its initial position so that the cycle can be repeated when the scale again reaches equilibrium. This type of mechanical recording comprising plunger 13, paper 43, raised type faces 44 and rotatable type wheel or displaceable indicating element 45 is old and common in the art, whereby type wheel 45 is rotated to an angular displacement corresponding to the force being transmitted by the scale.

Figure 2:
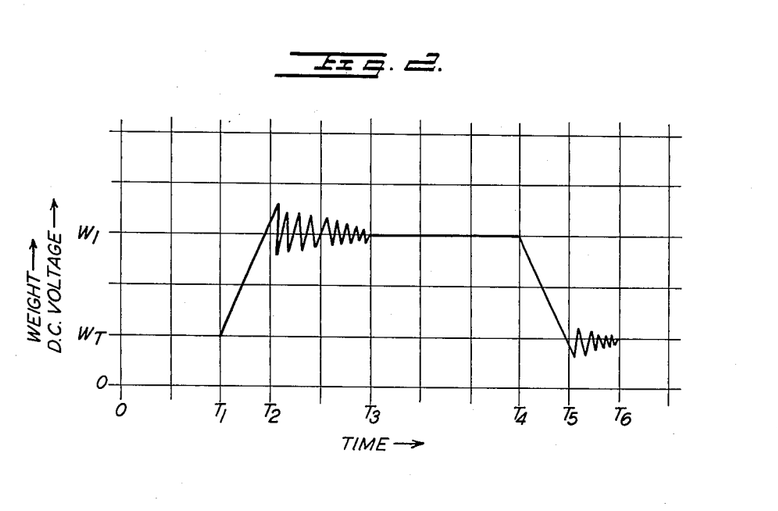
FIG. 2 is a graphic representation of the dynamic output signals transmitted during a weighing cycle by the transducer of FIG. 1.

The chart of FIG. 2 graphically presents the information that is sensed by the scale and transmitted to the recorder, included in which are vibrations caused by application and removal of the load on the scale. In this chart the curve is plotted by measuring proportionate forces, or weight, transmitted to the recorder by rod 7 in relation to time. Beginning at time zero, there is no load on the scale and the forces transmitted to the recorder are equal to the tare weight of the scale mechanism. At time $T_1$, the front wheels 9 have just come onto the scale platform 1 and as the wheels become supported by the platform 1, the weight being transmitted to the recorder increases from WT to $W_1$. At time $T_2$, the full weight of the wheels is being supported by the platform and the weight $W_1$ is being transmitted to the recorder. However, the sudden application of the weight of the wheels to the scale mechanism sets up high frequency vibrations in the scale mechanism which do not damp out until time $T_3$. Any attempt to accurately measure the weight transmitted by the wheels during the time interval $T_2$ to $T_3$ could result in a significant weighing error depending upon the instant at which the weight is taken.

As the wheels continue to pass across the scale after the vibrations have damped out, the forces transmitted to the recorder are steady and accurate until the wheels leave the scale platform at time $T_4$. In other words, the vehicle and the scale are in vertical equilibrium during the time period from $T_3$ to $T_4$ and any instantaneous recording of weight during this period will be accurate.

As shown in this chart, it would be possible to automatically actuate the recorder after a given time $T_3$, except for the fact that different vehicles would move at different speeds across the scale during different weighing cycles and no absolute, or quantitative, value can be assigned to time period $T_3$ minus $T_2$. Even more important, as the speed of the vehicle increases, the total time upon the scale, $T_4$ minus $T_2$, becomes shorter, and the increased speed increases the shock to the scale and correspondingly increases the amplitude and duration of the vibrations with a corresponding increase in time period $T_3$ minus $T_2$. Therefore, very high speeds could result in a condition whereby the vibrations do not damp out until the wheels have left the scale platform. Such a condition would make it impossible to obtain an accurate weight recording because there would be no stable or static signal corresponding to the time period $T_4$ minus $T_3$ shown in the graph.

This problem historically has been overcome in practice by arbitrarily holding the speed of vehicle 8 to a velocity that is low enough to insure the damping out of the vibrations in ample time to make a recording of the weight. But there is still another problem which has been encountered in the weighing of moving vehicles that cannot be overcome by speed control alone, that is, the condition illustrated in the chart of FIG. 3.

Figure 3:
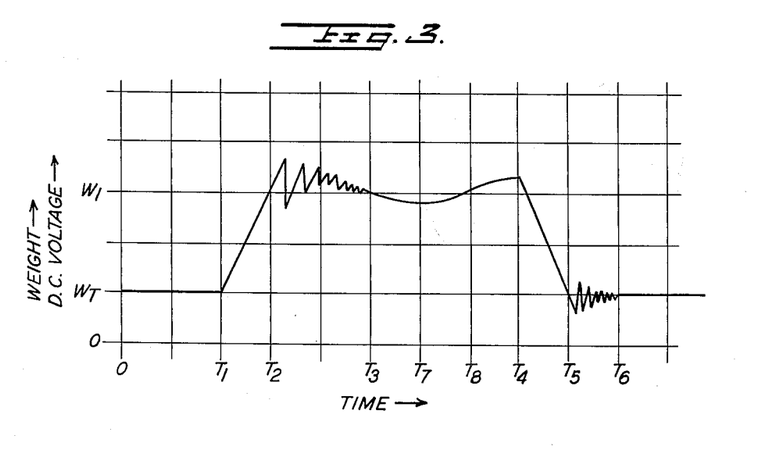
FIG. 3 is a graphic representation of the dynamic output signals transmitted during a weighing cycle by the transducer of FIG. 1, wherein a wheel of the vehicle is out-of-round or eccentric.

In FIG. 3 is illustrated a weighting cycle encountered when a wheel of a vehicle is out-of-round or eccentric about its axle. In this connection, the wheels pass onto the scale at time $T_1$ and are fully scale borne by time $T_2$. The usual high frequency vibrations occur from $T_2$ to $T_3$, being fully damped out by time $T_3$. However, the irregular conditions of wheel or wheels causes the vehicle to accelerate up and down and this low frequency vertical oscillation imparts low frequency oscillating weight forces to the scale platform 1, and the weight forces transmitted to the recorder oscillate correspondingly. Any attempt to record the weight during time period $T_4$ minus $T_3$ would depend on chance for accuracy. For example, an instantaneous weight recorded at time $T_7$ would be less than true weight $W_1$, or an instantaneous weight taken at time $T_8$ would be accurate. If the speed of the vehicle in all weighing cycles were constant, the frequency of the low frequency oscillations shown in FIG. 3 would change from vehicle to vehicle and this oscillating frequency has a very unpredictable value.

From the foregoing it is obvious that the automatic recording of weights actuated as a function of time or position on the scale platform is undesirable and leads to significant errors in weighing.

In both FIGS. 2 and 3, for purposes of complete presentation, there are shown the forces transmitted to the recorder from the time $T_4$ when the wheels begin to leave the scale platform through time $T_5$ when the wheels are completely ground-supported and through time $T_6$ when the high frequency vibrations in the scale mechanism caused by removal of the weight from the scale have damped out. Also in these figures, it should be noted that the curves plotted not only portray the weight forces transmitted to the recorder but also corresponding voltage being transmitted by transducer 11 in relation to time.

Figure 4:
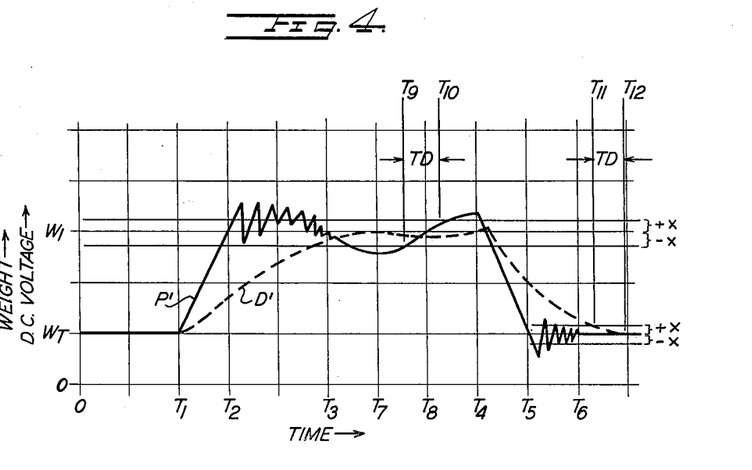
FIG. 4 is a graphic representation of pure and delayed dynamic output signals which actuate the weight recording mechanism.

For further explanation of the operating cycle of the present device, reference is now made to FIG. 4 which includes a graphic presentation of the pure and delayed voltages passing through coils P and D respectively, both in relation to the same time values. The pure signal, indicated as P′, is the same signal shown in previous FIG. 3. Referring to FIG. 4 and its relationship to FIG. 1, when the wheels 9 pass onto the scale platform 1, the mechanical force being transmitted by rod 7 increases and causes a corresponding increase in the pure voltage signal from transducer 11. This pure signal goes directly to coil P of relay 18. However, the delayed voltage signal D′, even though it begins to increase at time $T_1$, is delayed in the sense that it does not increase as fast as the pure signal P′. Therefore, the delayed signal D′ increases so slowly that it does not equal pure signal P′ until a significant time period has elapsed. The two voltage signals are equal only after time $T_3$. However, this state of equality is very brief, because delayed signal D′ is still increasing while pure signal P′ has already reached its peak and is presently decreasing so that, before time delay period TD can elapse, the two signals are out of balance by a value greater than X. This momentary equality will not actuate relay 18 because, as stated before, the two signals were not within tolerance X of each other long enough for time delay relay 18 to operate.

Even though the pure signal P' continues to oscillate as a result of vertical motion in the vehicle being weighed, the pure signal P' again comes within minus X of the delay signal D' at time $T_9$ and remains within minus X or plus X of the delayed signal for a time interval equal to or greater than time interval TD. Therefore, at the expiration of time interval TD, which ends at time $T_{10}$, the voltages to coils P and D of FIG. 1 will still be within plus or minus X of each other and will allow printing plunger 13 to be actuated downwardly by energizing solenoid 38, as stated before. It can be seen that a weight recorded by this method at time $T_{10}$ will assuredly be within a tolerance of plus or minus X of the true weight $W_1$.

Continuing with FIG. 4, it is shown that, at time $T_4$, the load begins to leave the scale thereby creating a rapid decrease in pure signal P' until, at $T_5$, pure signal P' is again equal to the tare weight of the scale and, at time $T_6$, the high frequency vibrations caused by removal of the load have damped out. From the time that pure signal P' becomes less than delayed signal D', occurring just after time $T_4$, delayed signal D' begins to slowly decrease until it comes within tolerance plus X of pure signal P' at time $T_{11}$. After time interval TD has elapsed, at time $T_{12}$, the relay arm 26 will again return to center thereby causing the printing plunger 13 to again print the weight being presented at that instant by recorder 12. In this case, the weight being printed will be the tare weight WT of the scale. The purpose of printing the tare weight after each weighing cycle is to check the scale and recorder mechanism in the event that the indicated tare has shifted during the weighing cycle and possibly giving erroneous weights. Shifting of the tare weight may result from mechanical misalignment of the various parts of the scale, which misalignment sometimes is caused by the sudden application of load to and vibrations in the scale.

Figure 5:
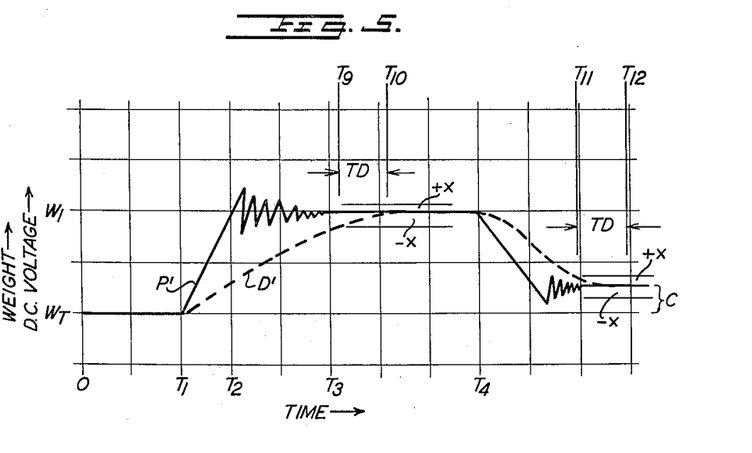
FIG. 5 is a graphic representation of pure and delayed dynamic output signals, wherein the tare weight signal has shifted during the weighing cycle.

An example of a shift in tare weight of the transmitted force in either the scale or the recorder mechanism is shown in FIG. 5 wherein the recorder prints the accurate weight of the vehicle at time $T_{10}$, but the tare weight has shifted so that the recording of tare weight taken at time $T_{12}$ will be equal to WT, the tare equilibrium position, plus C, where C is the erroneous shift in tare. The printed tare weight error, thus having been sensed and measured, could be manually corrected. Such manual correction would require a delay in the next weighing cycle, which delay is usually undesirable.

An important feature of my invention is that it will automatically and quickly correct tare weight errors by automatically sensing the magnitude of the error and feeding the information back to a control mechanism which makes the corrections to bring the tare weight back within a tolerance of plus or minus X, as will appear from the following further description.

Since the tare of the scale has shifted to a value of WT plus C, the recorded tare weight will also be WT plus C. The scale includes a tare-zeroing mechanism to automatically correct this error by adjusting the printing wheel 45 with respect to the scale so that the type for printing the correct tare weight WT will be within an arbitrary tolerance or first predetermined distance from the tare-equilibrium position WT, i.e. to plus or minus Y. The recorded weight will then be within a tolerance Y of the accurate tare weight WT. For this purpose a pair of electrical contacts 46 and 47 are rigidly attached to the type wheel 45 and are located in a position to make electrical contact with wiper contact 41 under proper conditions.

Figure 13:
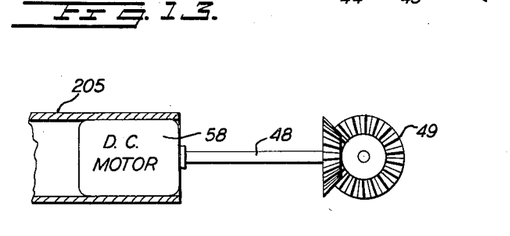
FIG. 13 is a detailed view of the tare-zeroing driving means.

The tare correction circuit operates in the following manner. Since wiper contact 41 has been energized as a result of equilibrium in the scale, and since type wheel 45 and contact 46 have been angularly displaced equal to error C, which is greater than tolerance Y, wiper 41 makes electrical contact with contact 46 to send an energizing voltage to direct current motor 58. A tare-zeroing driver, electric motor 58 is fastened to shaft 205 which is operatively connected to the platform 1 by conventional linkages (not shown). The shaft rotates through an angle proportionate to the displacement of platform 1. When the electric motor is not energized by electric power, it operates as a brake and transmits the motion of shaft 205 to wheel 45 through bevel gears 49. This rotates wheel 45 through an angle proportionate to the displacement of platform 1. When electric motor 58 is energized, it will drive the type wheel in the proper direction in relation to the scale through bevel gears 49, thereby rotating the type wheel to bring WT toward the center line of the printing plunger 13. Motor 58 will continue to rotate the type wheel until wiper 41 is within plus Y displacement of WT, at which time wiper 41 will no longer be in contact with contact 46 and motor 58 will cease to drive due to loss of voltage.

If the error was on the minus Y side of WT, contact 47 would then carry an energizing voltage that would drive motor 58 in the opposite direction. This tare correction circuit will not operate when the angular displacement of the type wheel is greater than a second predetermined displacement $W_5$. This arbitrary correction limit is established to prevent correction when printing weights in the realm of vehicle weights which, of necessity in this case, must be greater than $W_5$. A similar correction limit on the minus side has been established at $W_6$ which is beyond the maximum weight represented in raised type 44 on the circumference of type wheel 45.

Figure 6:
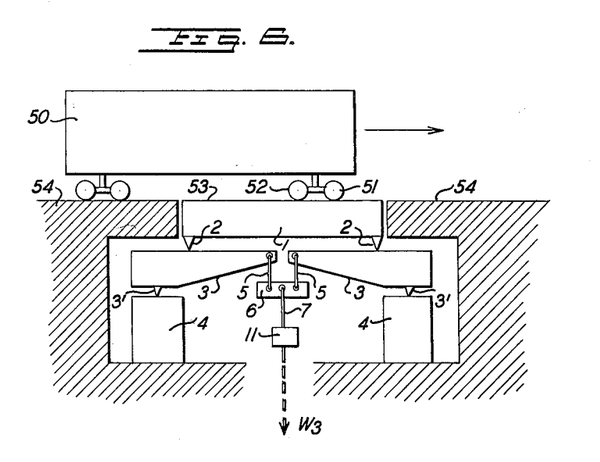
FIG. 6 is a partial diagrammatic view of a scale supporting a vehicle having multi-wheel truck units.

In FIG. 6 there is illustrated a similar scale mechanism as described in the previous disclosure except that in this case a vehicle having multi-wheeled rolling units, such as a railroad car, is being weighed. In order to weigh the front end of car 50 it is necessary to weigh both wheels 51 and 52 which are supported by a section of track 53 carried by the scale platform 1. Track sections 54 are supported by the ground. In this case the combined weight of wheels 51 and 52 are equal to $W_3$ which is being transmitted to the recorder by rod 7, causing transducer 11 to send a pure voltage signal P' to the electrical control circuits of the device. While not shown, the same electrical control, recording and tare correction circuits, as shown in FIG. 1, are connected to transducer 11 and rod 7.

Figure 7:
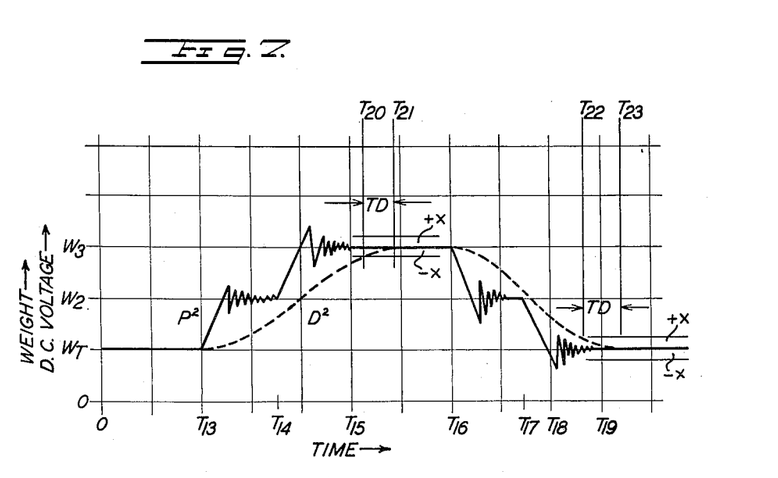
FIG. 7 is a graphic representation of pure and delayed dynamic output signals caused by the vehicle of FIG. 6 passing over the scale.

The operation of the device when weighing rolling units having a plurality of wheels, such as wheels 51 and 52, can best be described by referring to FIG. 7 in which wheel 51 passes onto the scale at time $T_{13}$ and increased the pure signal $P^2$ to a vibrating value of approximately $W_2$. At time $T_{14}$, wheel 52 comes onto the scale and increases the pure signal $P^2$ to a vibrating value of approximately $W_3$, which vibrations damp out in this example by time $T_{15}$.

Meanwhile the delayed signal $D_2$ has been designed to be slow enough that it will not rise to a value of $W_2$ until after time $T_{14}$, thereby avoiding the possibility of printing the weight while wheel 51 is alone on the scale, provided that car 50 is traveling at a reasonable speed.

In the same manner as previously described the example of FIG. 7 illustrates the operation of the present device whereby the pure signal $P^2$ and delayed signal $D^2$ are within a tolerance of plus or minus X for a time interval TD beginning at time $T_{20}$ and ending at time $T_{21}$, and beginning at time $T_{22}$ and ending at time $T_{23}$, thereby actuating a printed record of weight at time $T_{21}$ and of tare weight at time $T_{23}$. Other time values shown in FIG. 7 are: time $T_{15}$ being the damping out of high frequency vibrations, time $T_{16}$ being the departure of wheel 51 from the scale platform, time $T_{17}$ being the departure of wheel 52 from the scale platform completed by time $T_{18}$, and time $T_{19}$ being the damping out of high frequency vibrations resulting from removal of the load from the scale.

Figure 8:
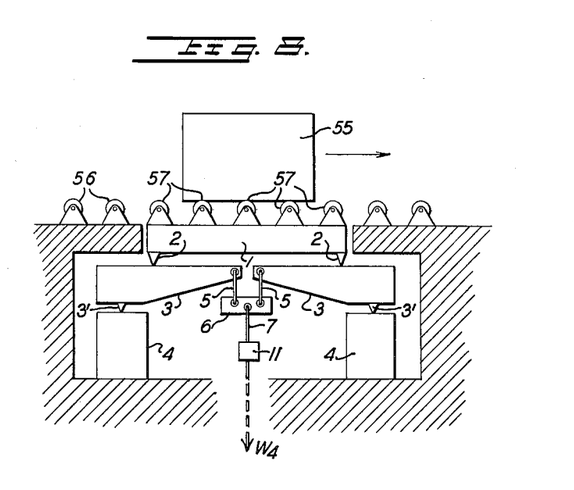
FIG. 8 is a partial diagrammatic view of a scale having rollers over which pass an object to be weighed.

In FIG. 8 there is shown a still further modification of the present device whereby object 55 is moving in the direction shown and passing over a scale to be weighed. In this case the scale would be of a type and size commensurable with the weight range of objects to be weighed, and a pit mounted scale like the scale of FIG. 1 is shown only for purposes of consistency in this application. Object 55 is supported by rollers 56 when over the ground, and is supported by rollers 57, carried by the scale platform, when over the scale platform. The operation of my device for weighing objects in this modification is similar to the previous disclosure, except the transmission of forces in relation to time assumes a somewhat different pattern as shown in the graphic presentation of FIG. 9.

Figure 9:
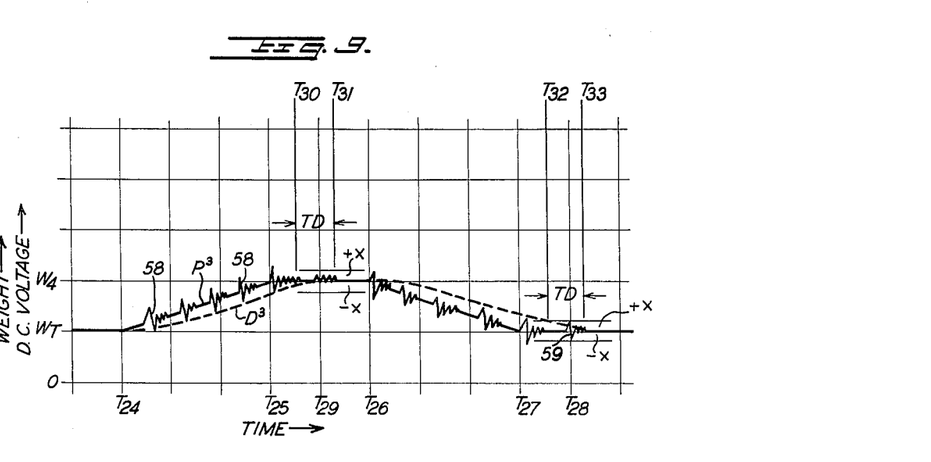
FIG. 9 is a graphic representation of pure and delayed dynamic output signals caused by the object of FIG. 8 passing over the scale.

In FIG. 9 the object 55 passes onto the scale at time $T_{24}$ and is fully scale borne by time $T_{25}$. It should be noted that each time the object comes onto another scale-supported roller 57, a slight vibration enters the scale mechanism and appears in the pure voltage signal $P^3$ as indicated by vibrations 58 and 59. The object is fully scale supported from time $T_{25}$ to $T_{26}$, and then leaves the scale from time $T_{26}$ to time $T_{27}$. The delayed voltage signal $D_3$ comes within X tolerance of pure signal $P^3$ at time $T_{30}$ and remains within tolerance for time interval TD so that a recording of weight $W_4$ is made at time $T_{31}$. Similarly the delayed signal $D_3$ is again within tolerance X of pure signal $P^3$ at time $T_{32}$ and remains so for time interval TD, so that printing of the tare weight occurs at time $T_{33}$. In this example, the vibrations 59 which occur at time $T_{29}$ and time $T_{28}$, are small enough in amplitude so as not to disturb the time delay interval TD. If, by chance, these vibrations were greater than plus or minus tolerance X, the time interval TD would begin anew after the vibrations had damped out.

From the foregoing description it will be obvious that the method of weighing moving objects disclosed herein comprises the following steps: Sensing the weight of the object being weighed, sensing the stability or equilibrium of the object being weighed, sensing and measuring the errors in weight measurement of previous weighing cycles, recording weight of the object only after the object has reached equilibrium, and correcting errors in weight measurement before the next weighing cycle.

The equilibrium accuracy tolerance plus or minus X and the tare accuracy tolerance plus or minus Y can be arbitrarily established to have any respective quantitative values desired while not disturbing the basic method or structure of the invention.

Since weight in the examples of this application is transmitted as a physical or electrical force, the weighing and recording mechanism of this invention can be used for the accurate measurement of static and dynamic forces regardless of the cause of said forces, and will result in the recording of weights well within the accuracy standards for the weighing of railway freight cars, which normally are 0.2% of the recorded reading, and in certain States and for certain commodities are as small as 0.1% of the recorded reading.

It is to be understood that other electrical or mechanical components may be substituted for components shown herein to accomplish the same result and various other changes may be made in the specific weighing and recording mechanisms disclosed and described herein without sacrificing any of the advantages thereof and without departing from the scope of the appended claims.

I claim:

1. In a scale including a displaceable force-receiving member and means mounting said force-receiving member so that it is capable of displacement; the improvement comprising means for generating an electric signal proportional to the displacement of the force-receiving member, means electrically connected to said means for generating an electric signal for suppressing high frequency components of said generated electric signal due to sudden changes in the displacement of the force-receiving member, means responsive to the displacement of the force-receiving member for indicating a digitized value of the displacement of the force-receiving member, recorder means for recording said indicated digitized value, means for actuating said recorder means, and means electrically connected to said means for generating an electric signal and said means for suppressing high frequency components of said generated electric signal restraining operation of said recorder-actuating means until the generated electric signal and the electric signal with the high frequency components suppressed are within a predetermined tolerance from equality.

2. A scale as set forth in claim 1 in which the recorder-actuating means is restrained until the generated electric signal and the resultant electric signal are within a predetermined tolerance from equality for a predetermined time.

3. A scale for weighing articles while in motion including a displaceable force-receiving member over which the article is adapted to move, means mounting said force-receiving member so that it is capable of oscillation, means for generating an oscillating pure electric signal proportionate in magnitude to the force exerted on the force-receiving member, means for damping out the high frequency oscillating signals of said pure electric signal and to delay remaining low frequency oscillating signals in the pure signal in relation to time, thereby generating a delayed electric signal, a displacement indicator, means operatively connecting said displacement indicator with said force-receiving member so that said displacement indicator is operated in response to a force exerted on said force-receiving member to indicate the displacement of said force-receiving member, recorder means for recording the extent of the displacement of said force-receiving member indicated by said displacement indicator, means for actuating said recorder means in response to said generated electric signal, and means restraining operation of said recorder-actuating means until the oscillations of said pure electric signal and the oscillations of the delayed electric signal are within a predetermined amplitude.

4. A scale as set forth in claim 3 in which the means for generating the oscillating pure electric signal is a transducer, the means for restraining operation of the recorder-actuating means is a differential electromagnetic relay having a pair of electromagnetic coils, a first circuit couples said transducer to one of said coils and transmits the pure electric signal thereto, a second circuit couples said transducer to the other of said coils and includes means for generating from said pure electric signal the delayed electric signal, and the means for actuating said recorder means is held restrained until the pure and delayed signals passing through said respective coils are within a predetermined tolerance from equality for a predetermined time.

5. A scale as set forth in claim 4 in which the means in said second circuit for generating said delayed electric signal includes a filter to damp out oscillations of said pure electric signal.

6. A scale as set forth in claim 4 in which said first circuit is parallel to said second circuit.

7. A scale as set forth in claim 4 in which a magnetic body is positioned in the fields of said first coil and said second coil, and the operation of the recorder means is restrained until the forces exerted on said magnetic body by said electromagnetic coils differ by less than a predetermined value.

8. A scale as set forth in claim 7 in which said first circuit is in parallel to said second circuit and in which said means for generating from said pure electric signal the delayed electric signal includes a filter comprising a resistor in series with said coil and a capacitor in parallel with said coil.

9. A scale as set forth in claim 5 in which the means for actuating said recorder means includes a recording circuit including a magnetic body positioned in the fields of said first and second electromagnetic coils, means for actuating the recording circuit when the forces exerted on said magnetic body by said first coil and said second coil differ by less than a predetermined value, and the operation of the recorder means is restrained until said recording circuit is actuated.

10. A scale as claimed in claim 9 in which the displacement indicator includes an indicating element displaceable by a distance proportional to the displacement of said force-receiving element and tare-zeroing means for returning the displaceable indicating element to a zero tare position within a first predetermined distance from a tare equilibrium position when the position of a displaceable indicating element is more than said first predetermined distance but less than a second predetermined distance from said tare equilibrium position, the means for operating the tare-zeroing means being electrically coupled to the recording circuit and including means to operate the tare-zeroing means only when the recording circuit is actuated.

11. A scale as set forth in claim 9 in which the recording circuit comprises a control circuit including a source of power, and a controlled circuit comprising a source of power, means for opening the controlled circuit when the control circuit is closed, said means for restraining the operation of the recorder means including means to restrain operation thereof until the controlled circuit is closed, said means for actuating the recording circuit opening the control circuit when the forces exerted on said magnetic body by said first coil and said second coil differ by less than a predetermined amount.

12. A scale as set forth in claim 9 in which the recording circuit comprises a control circuit including a source of power and a controlled circuit comprising a source of power, a normally-closed relay, means for opening the normally-closed relay when said control circuit is closed and means for restraining the operation of the recorder means until the normally-closed relay is closed, said means for actuating the recording circuit including means to open the control circuit when the forces exerted on said magnetic body by said first coil and said second coil differ by less than said predetermined value.

13. A scale as set forth in claim 12 in which the displacement indicator includes an indicating element displaceable by a distance proportional to the displacement of the force-receiving member, and in which the recorder means includes means to record the position of the displaceable indicating element.

14. A scale as set forth in claim 13 in which the displaceable indicating element carries type and in which the recorder means includes a plunger disposed adjacent the displaceable indicating element and a plunger-actuating solenoid electrically coupled to said controlled circuit, the plunger being positioned so that it will be moved toward said type by the flow of current in said solenoid on the closing of said controlled circuit, whereby the position of the movable indicating element will be recorded on a tape disposed between the plunger and the type upon the closing of said control circuit.

15. A scale as claimed in claim 9 in which the magnetic body is mounted so as to be movable in response to the forces exerted by said electromagnetic coils, said electromagnetic coils being positioned so that said forces exerted thereby oppose each other, said means for actuating said recording circuit including means to actuate the recording circuit when the displacement of said magnetic body from an equilibrium position is less than a predetermined distance.

16. A scale as claimed in claim 15 including means restraining the magnetic body to an equilibrium position.

17. A scale as claimed in claim 15 in which the relay includes a damper for slowing the return of the magnetic body to equilibrium from a displaced position, whereby the magnetic body will not be returned to equilibrium and the recorder will not be actuated until the electromagnetic forces exerted by the electromagnetic coils differ from each other by less than a predetermined amount for more than a predetermined period of time.

18. A scale as claimed in claim 3 in which the displacement indicator includes an indicating element displaceable by a distance proportional to the displacement of said force-receiving element and tare-zeroing means for returning the displaceable indicating element to a zero tare position within a first predetermined distance from a tare equilibrium position when the position of the displaceable indicating element is more than said first predetermined distance but less than a second predetermined distance from said tare equilibrium position.

19. A scale as set forth in claim 18 which includes means for operating said tare-zeroing means only when the oscillations of the force-receiving element have been damped to less than a predetermined value.

20. A scale as claimed in claim 18 in which the tare-zeroing means includes a low tare contact bar and a high tare contact bar fixed to said displaceable indicating element and extending therealong in the direction of movement thereof, said tare contact bars being spaced from each other along said direction of movement by substantially twice said first predetermined distance, the remote ends of said contact bars being spaced from each other along said direction of movement by substantially twice said second predetermined distance, a stationary wiper contact disposed adjacent the path of travel of said contact bars and positioned to contact said contact bars as they move past it, and a tare-zeroing driver operatively connected to said movable indicating element and constructed and arranged to drive said movable indicating element to said zero tare position when the stationary wiper contact contacts one of said contact bars.

21. A scale as claimed in claim 20 in which the tare-zeroing means includes a high tare-zeroing circuit which includes said high tare contact bar, a low tare-zeroing circuit which includes said low tare contact bar, said tare-zeroing circuits including sources of power, said high tare-zeroing circuit being closed by contact between the stationary wiper contact and said high tare contact bar, said low tare-zeroing circuit being closed by contact between the stationary wiper contact and said low tare contact bar, said tare-zeroing driver including a reversible-direction electric motor electrically connected to said tare-zeroing circuits and rotated in a low tare direction by power in said low tare-zeroing circuit and in a high tare direction by power in said high tare-zeroing circuit, the motor being coupled to said movable indicating element so as to drive the movable indicating element to said zero tare position when the stationary contact contacts one of said contact bars.

22. A scale as set forth in claim 10 in which the recording circuit includes a control circuit having a source of power, and a controlled circuit comprising a source of power, means for opening the controlled circuit when the control circuit is closed and means for restraining the operation of the recorder means until the controlled circuit is closed, said means for actuating the recording circuit including means to open the control circuit when the forces exerted on said magnetic body by said first coil and said second coil differ by less than a predetermined amount, and in which the tare-zeroing means includes a low tare contact bar and a high tare contact bar fixed to the displaceable indicating element extending therealong in the direction of movement thereof, said tare contact bars being spaced from each other along said direction of movement by substantially twice said first predetermined distance, the remote ends of said contact bars being spaced from each other along said direction of movement by substantially twice said second predetermined distance, a stationary wiper contact disposed adjacent the path of travel of said contact bars and positioned to contact said contact bars as they move past it, a high tare-zeroing circuit which includes said high-tare contact bar, a low tare-zeroing circuit which includes said low-tare contact bar, said high tare-zeroing circuit being closed by contact of the stationary wiper contact with said high-tare contact bar, said low tare-zeroing circuit being closed by contact of the stationary wiper contact with said low-tare contact bar, said stationary wiper contact being electrically connected to said controlled circuit so that the closing of said controlled circuit will supply power to said stationary wiper contact, and an electrically operated tare-zeroing driver electrically connected to said tare-zeroing circuits and operatively connected to said displaceable indicating element, said tare-zeroing driver including means to drive said displaceable indicating element to said zero-tare position when one of said tare-zeroing circuits is closed and said controlled circuit is closed.

23. A method for recording the weight of objects while in motion which comprises imposing the weight of the object to be weighed upon a displaceable platform of a scale, while said object is moving continuously across the platform, indicating the displacement of the platform, generating a pure oscillating electrical signal proportionate in magnitude to the displacement of the platform, delaying said electrical signal and damping oscillations therein, thereby generating a delayed electrical signal, measuring the difference between the pure electrical signal and the delayed electrical signal, and recording the weight of the object indicated only when said difference between the oscillations of said pure and said delayed electric signals is less than a predetermined amount.

References Cited in the file of this patent

UNITED STATES PATENTS

| | | |
|---|---|---|
| 2,217,208 | Von Pein | Oct. 8, 1940 |
| 2,678,206 | Muldoon | May 11, 1954 |
| 2,723,844 | Thurston | Nov. 15, 1955 |
| 2,806,685 | Vande Sande | Sept. 17, 1957 |
| 2,856,176 | Cooper | Oct. 14, 1958 |
| 2,882,035 | Lauler | Apr. 14, 1959 |
| 2,919,123 | Spademan | Dec. 29, 1959 |

FOREIGN PATENTS

| | | |
|---|---|---|
| 771,052 | Great Britain | Mar. 27, 1957 |